United States Patent
Davis et al.

(10) Patent No.: US 7,386,786 B2
(45) Date of Patent: Jun. 10, 2008

(54) METHOD AND APPARATUS FOR PROCESSING A DYNAMIC WEBPAGE

(75) Inventors: Lee M. Davis, Federal Way, WA (US); Wade A. Matveyenko, Kirkland, WA (US); Robert M. Spearman, Seattle, WA (US)

(73) Assignee: The Cobalt Group, Inc., Seattle, WA (US)

( * ) Notice: Subject to any disclaimer, the term of this patent is extended or adjusted under 35 U.S.C. 154(b) by 6 days.

(21) Appl. No.: 10/350,810

(22) Filed: Jan. 24, 2003

(65) Prior Publication Data
US 2004/0148565 A1    Jul. 29, 2004

(51) Int. Cl.
*G06N 3/00*    (2006.01)

(52) U.S. Cl. .................................................... 715/234

(58) Field of Classification Search ............. 715/501.1, 715/513, 515, 517, 523, 530
See application file for complete search history.

(56) References Cited

U.S. PATENT DOCUMENTS

| | | | | |
|---|---|---|---|---|
| 5,421,015 | A | | 5/1995 | Khoyi et al. ................ 718/107 |
| 5,649,186 | A | * | 7/1997 | Ferguson ..................... 707/10 |
| 5,974,428 | A | | 10/1999 | Gerard et al. ............... 707/203 |
| 6,018,748 | A | * | 1/2000 | Smith ....................... 715/501.1 |
| 6,021,416 | A | * | 2/2000 | Dauerer et al. ......... 715/501.1 |
| 6,021,426 | A | * | 2/2000 | Douglis et al. ............. 709/200 |
| 6,041,344 | A | | 3/2000 | Bodamer et al. ........... 709/203 |
| 6,061,698 | A | * | 5/2000 | Chadha et al. .............. 715/513 |
| 6,067,559 | A | * | 5/2000 | Allard et al. ................ 709/202 |
| 6,236,994 | B1 | | 5/2001 | Swartz et al. ................. 707/6 |
| 6,295,061 | B1 | * | 9/2001 | Park et al. ................... 345/764 |
| 6,353,824 | B1 | * | 3/2002 | Boguraev et al. ............ 707/5 |
| 6,519,617 | B1 | * | 2/2003 | Wanderski et al. ......... 715/513 |
| 6,539,370 | B1 | * | 3/2003 | Chang et al. .................. 707/2 |
| 6,553,373 | B2 | * | 4/2003 | Boguraev et al. ............ 707/5 |
| 6,564,216 | B2 | | 5/2003 | Waters ........................ 707/10 |
| 6,606,525 | B1 | * | 8/2003 | Muthuswamy et al. ....... 700/52 |
| 6,678,706 | B1 | * | 1/2004 | Fishel ...................... 715/501.1 |
| 6,721,747 | B2 | | 4/2004 | Lipkin ......................... 707/10 |
| 2001/0039594 | A1 | * | 11/2001 | Park et al. ................... 709/311 |
| 2002/0049831 | A1 | * | 4/2002 | Platner et al. .............. 709/218 |

(Continued)

OTHER PUBLICATIONS

Internet Archive: Audio Archive, http://www.archive.org/audio/audio-searchresults.php?search=@start=0&limit=100&sort=ad, printed May 12, 2004, pp. 1-12.

(Continued)

*Primary Examiner*—Stephen Hong
*Assistant Examiner*—Kyle R Stork
(74) *Attorney, Agent, or Firm*—John R. Thompson; Stoel Rives LLP

(57) ABSTRACT

A dynamic webpage processing method, including identifying a static component within a dynamic webpage, the static component comprising computer code defining at least a portion of a target webpage and configurable via first configuration data, rendering the static component as a static markup language equivalent, and returning the target webpage upon request through rendering a dynamic component within the dynamic webpage based on second configuration data is disclosed. Thus, static component(s) can be pre-rendered, leaving only the dynamic component(s) of the dynamic webpage for on-the-fly rendering when a target webpage request is made. This can greatly reduce dynamic webpage processing requirements, particularly in situations where the webpage configuration changes or evolves slowly.

23 Claims, 7 Drawing Sheets

U.S. PATENT DOCUMENTS

| | | | |
|---|---|---|---|
| 2002/0154146 A1* | 10/2002 | Rodriquez et al. | 345/660 |
| 2002/0169851 A1* | 11/2002 | Weathersby et al. | 709/218 |
| 2002/0196273 A1 | 12/2002 | Krause | 715/738 |
| 2002/0198878 A1* | 12/2002 | Baxter et al. | 707/6 |
| 2003/0014443 A1* | 1/2003 | Bernstein et al. | 707/513 |
| 2003/0023632 A1* | 1/2003 | Ries et al. | 707/513 |
| 2003/0033378 A1* | 2/2003 | Needham et al. | 709/218 |
| 2003/0074392 A1* | 4/2003 | Campbell et al. | 709/203 |
| 2003/0177175 A1* | 9/2003 | Worley et al. | 709/203 |
| 2004/0230897 A1* | 11/2004 | Latzel | 715/513 |

OTHER PUBLICATIONS

Internet Archive: Democracy Now, http://www.archive.org/audio/collection.php?collection=democracy_now, printed May 12, 2004, pp. 1-3.

* cited by examiner

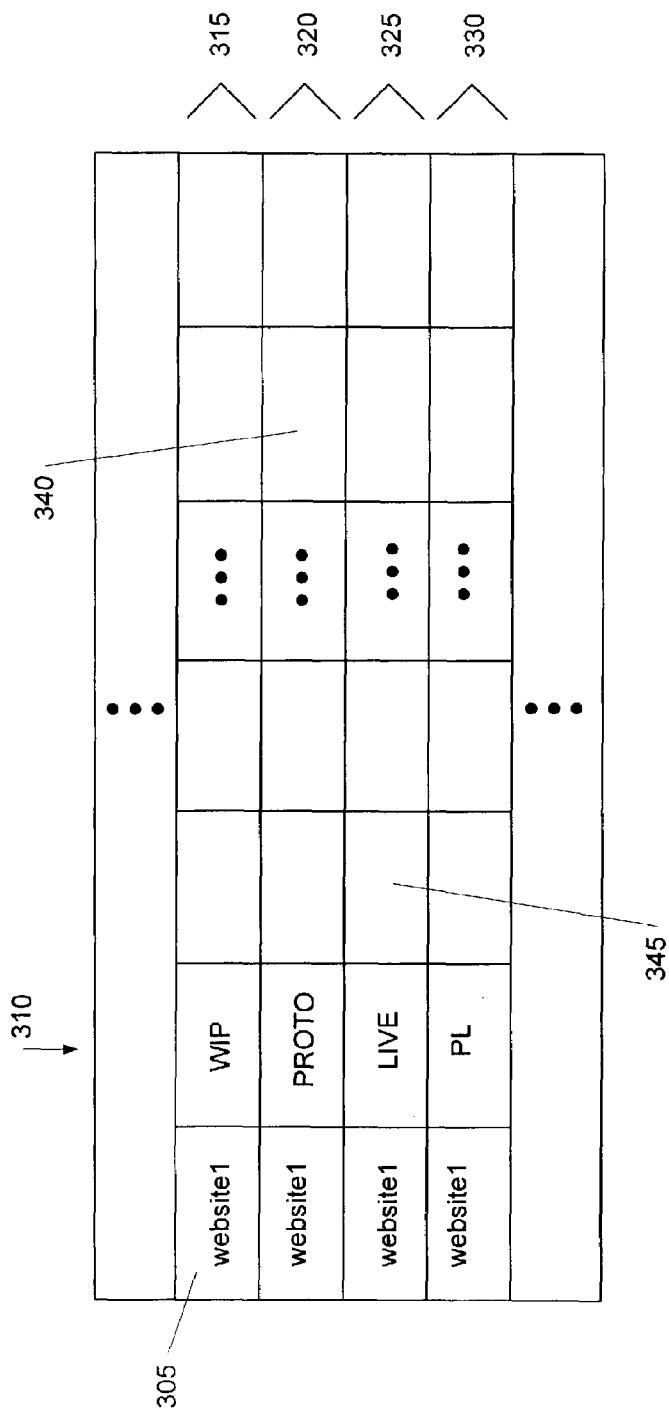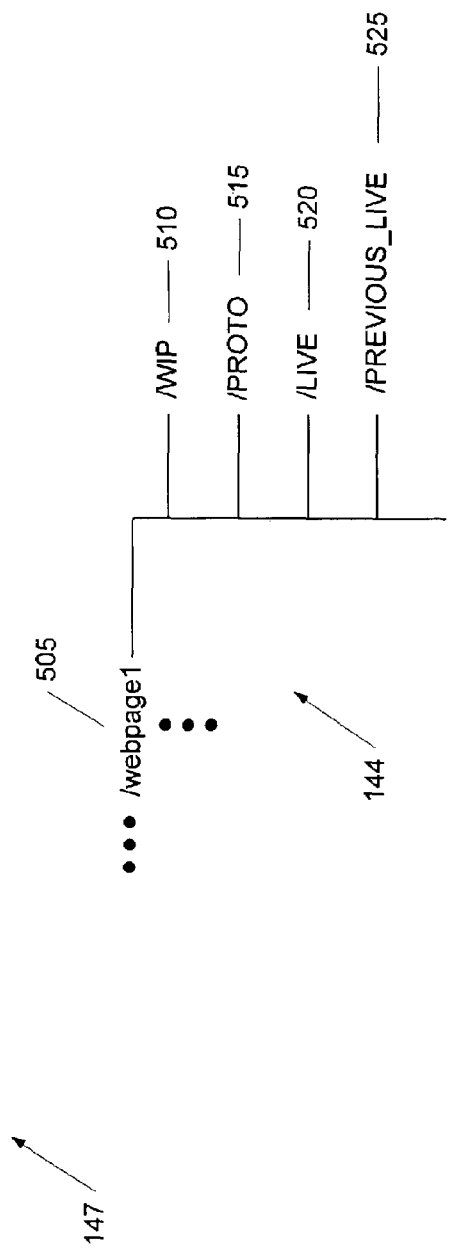

DYNAMIC PAGE RETRIEVAL

{
WS: HTTP://... request for dynamic page received;
WS: access control, requestor verification based on HTTP://... request;
WS: if access control OK, then forward HTTP://... on to WLAS, else deny access;
AS: parse HTTP://... request parameters:
{
case PROOF /*build PROOF page */
case LIVE /*build LIVE page */
    {
        include static html components from PROTO || LIVE || PREVIOUS_LIVE subdirectory for page; /* no rendering !
        render dynamic components from JSP template using configuration data PROTO || LIVE and run-time data;
        return rendered page;
    }
case PREVIOUS_LIVE /*build previous live page*/
    {
        if keep_static /* if static html files are retained */
            then
            {
                include static html components from PREVIOUS_LIVE subdirectory for page; /* no rendering !
                render dynamic components from JSP template using PREVIOUS_LIVE configuration data and run-time data;
            }
            else render static and dynamic components from JSP template (and static component JSP files as appropriate in PREVIOUS_LIVE subdirectory) using PREVIOUS_LIVE configuration data and run-time data;
        return rendered page;
    }
case WIP /*build work in progress page*/
    {
        render static and dynamic components from JSP template (and static component JSP files as appropriate in appropriate subdirectory) using appropriate configuration data and run-time data;
        return rendered page
    }
}}

WS = Web Server
AS = Application Server

FIG. 6

TRANSITION WIP → PROTO (aka ACTIVATION), PE in possession of PROOF REQUEST
{
    PE: determine static components in WIP page; /*looking at dynamic page template*/
    PE: using WIP configuration data for page, render identified static components to form static html file(s);
    PE: store WIP configuration data as PROTO configuration data for page;
    PE: store static html file(s) in .../PROTO subdirectory of hierarchical file system;
    PE: update links to .../PROTO subdirectory and PROTO configuration data;
    PE: apprise user of URL for proof page via WS;
}

PE = Publication Engine
WS = Web Server

FIG. 7

TRANSITION PROOF → LIVE (aka VERIFICATION), PE in possession of LIVE REQUEST
{
/* start by saving off current LIVE version */
if keep_static
    then PE: store static html files in .../LIVE subdirectory as .../PREVIOUS_LIVE subdirectory;
store LIVE configuration data for page as PREVIOUS_LIVE configuration data;
/* next, put PROOF information into LIVE */
PE: store static html files in .../PROOF to .../LIVE subdirectory;
PE: store PROOF configuration data for page as LIVE configuration data in configuration database
PE: update links to .../LIVE subdirectory and /LIVE configuration data;
}

PE = Publication Engine

FIG. 8

METHOD AND APPARATUS FOR PROCESSING A DYNAMIC WEBPAGE

TECHNICAL FIELD

This invention is generally directed to aspects of website management, and is particularly concerned with techniques for improving rendering performance of dynamic webpages.

BACKGROUND OF THE INVENTION

The "Web" is now well developed and literally millions of Web sites have been deployed and hosted on various servers around the world. Web sites comprise one or more related "pages," in some cases extending to scores or even hundreds of pages. The subject matter of web sites spans the full breadth of human interests and endeavors, and many web pages now include dynamic content as well as multi-media content, such as audio and video clips, slideshows and the like.

More recently, the use of "dynamic" webpages has become commonplace in website design, in part to ease design and publication burdens faced when attempting to build and manage large and feature-rich websites. Dynamic webpages are a type of webpage that produces potentially differing web content and/or interfacing on-the-fly based on one or more variable parameters passed to the webpage by a client browser or otherwise. Examples of dynamic webpages include java server pages or JSPs developed in accordance with the Java Server Pages Specification Version 1.2 (November 2001) and above available from Sun Microsystems of Mountain View, Calif. Another type of dynamic webpage includes active server pages or ASP developed in accordance with the Internet Information Services v 3.0 and above Software Development Kit available from the Microsoft Corporation of Redmond, Wash. Other dynamic webpages could include, by means of example only, Perl pages, PHP pages from the PHP Group, ColdFusion pages from Macromedia, Inc. of San Francisco, Calif., and servlets defined in Sun's Java Servlet Specification 2.1 and above.

Dynamic webpages are so powerful because of the active logic, conditional rules and/or heuristic instructions physically or virtually forming at least a part of each (collectively "code"). In the Java Server Pages example, such code is called a tag. This code is dependent on a variety of parameters passed to it, such as configuration data which is used to assist in defining the interface, fields, and typically, "static" information when the dynamic webpage is requested, rendered, and displayed to an end-user through a web browser or other paging review mechanism. In the automotive website context, a good example of configuration data would include parameters needed to assist or direct the code in rendering a specific auto dealer graphic, as well as parameters needed to cause the executing web server to issue and collect information related to a certain used car search parameter, and the like. This code also causes the web server executing the dynamic webpage to interact with other applications and objects, such as pulling dynamic or runtime data from, e.g., a separately maintained database. Again, in the automotive context, such runtime data can include used car inventory database results based on a query captured by a server executing the dynamic page on behalf of a potential automotive customer in communication with the server via a client-oriented browser.

The web designer community is looking to dynamic webpages as a way to contain the problem of ever growing and increasingly complex websites, while providing richer features and more detailed and varied content. Without dynamic webpages, web designers would have to craft, track and maintain each distinct webpage individually, and interaction with a browser supporting an end-user would be limited at best. Manually managing such an architecture would quickly prove hopelessly complex. A dynamic webpage, on the other hand, through an appropriate code structure, can define numerous distinct rendered pages to the browser depending on e.g. input provided by the end-user which is passed to the dynamic webpage in the form of configuration and/or runtime data. In fact, a small number of thoughtfully constructed dynamic webpages can actually define a complete website, if not multiple websites. As such, a dynamic webpage can therefore be thought of as a template for producing individually rendered webpages known as target webpages, which, from the end-user browser perspective, may appear and function quite distinctly but are in fact the product of the interaction between a common dynamic webpage template with a particular set of configuration and/or runtime data.

However, a new problem emerges when dynamic webpage templating is extensively leveraged. As fewer and fewer dynamic webpage templates are employed to define more and more target webpage alternatives, the resulting template code structure necessarily becomes more and more complex to account for planned site variation, and accordingly, more and more parameters must be passed and interpreted in connection with the template code before a desired target webpage can be rendered. Thus, rendering or executing the complex dynamic webpage template on-the-fly with the particular configuration/runtime data parameters increasingly taxes web server processing resources, and can perceptibly degrade "loading" performance and site responsiveness from an end-user perspective. In fact, independent of bandwidth considerations, it can take a number of seconds for a stressed, multi-site web server to acquire the appropriate configuration and dynamic data, assemble, interpret and render the dynamic webpage, and return the desired target webpage to the requesting end-user. This is so even though certain areas and features of the target webpages, such as the header and footer sections, do not appear to change every time the end-user requests those pages or as the end-user traverses the website. Therefore, it would be advantageous to provide a web management technique that leverages the power of dynamic webpages while increasing web server responsiveness and ultimately speedier delivery of the target webpage to the end-user.

SUMMARY OF THE INVENTION

Responsive to these issues, the present invention is directed in part to a dynamic webpage processing method, which includes identifying a static component within a dynamic webpage, the static component comprising computer readable program code defining at least a portion of a target webpage and configurable via first configuration data, rendering the static component as a static markup language equivalent, and returning the target webpage upon request, which involves rendering a dynamic component within the dynamic webpage based on second configuration data. Thus, one or more static components can be pre-rendered, leaving only the dynamic component(s) of the dynamic webpage to be rendered on-the-fly when a request for the target webpage formed by the combination of the dynamic webpage in combination configuration and/or dynamic data is made.

This can greatly reduce dynamic webpage processing requirements, particularly in situations where the webpage configuration changes or evolves slowly.

Other aspects of the present invention include a server implemented method for returning a target webpage based at least in part on a dynamic webpage, as well as a novel target webpage configuration.

Additional aspects and advantages of this invention will be apparent from the following detailed description of particular embodiments thereof, which proceeds with reference to the accompanying drawings.

BRIEF DESCRIPTION OF THE DRAWINGS

FIG. 3 is a diagram of an example organization of the configuration database shown in FIG. 1.

FIG. 5 diagrammatically illustrates an example of hierarchical storage in accordance with an embodiment of the invention.

FIG. 6 depicts pseudocode of dynamic webpage request processing undertaken by elements of the website manager shown in FIG. 1.

FIG. 7 depicts pseudocode of WIP to PROOF stage transition processing undertaken by elements of the website manager shown in FIG. 1.

FIG. 8 depicts pseudocode of PROOF to LIVE stage transition processing undertaken by elements of the website manager shown in FIG. 1.

DETAILED DESCRIPTION

Figure 1:
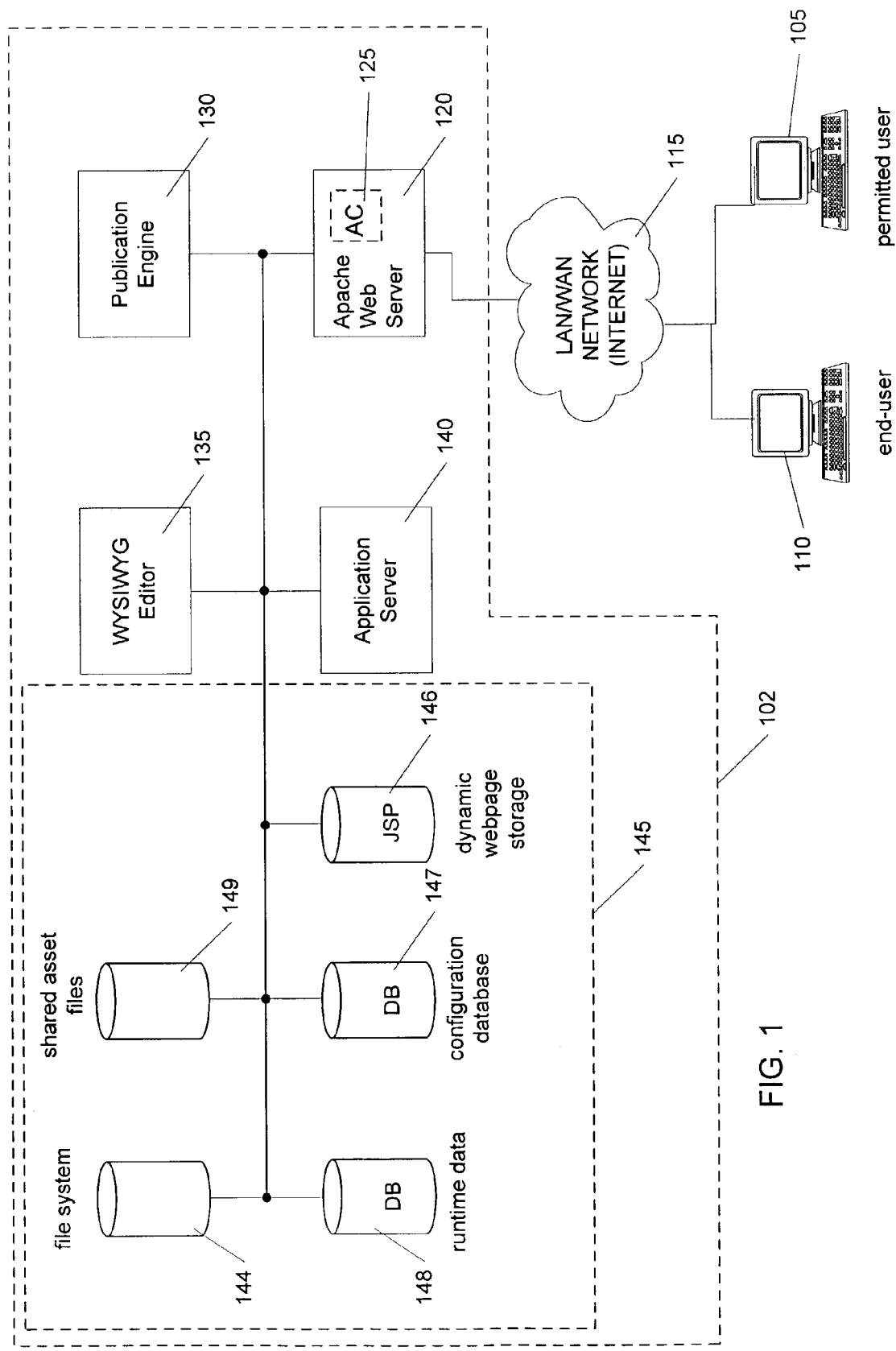
FIG. 1 is a schematic diagram of a system including a website manager according to an embodiment of the present invention.

FIG. 1 depicts a system including a website manager according to an embodiment of the present invention. Here the website manager 102 is shown in FIG. 1 to be in signal communication with the network 115, which may conveniently comprise a LAN or local area network, a wide area network or WAN, or a combination thereof as is known in the art. Typically, though not required, network 115 can be viewed as a component of, or encompassing the Internet. At the other end of the network 115, an end-user computer 110 is provided which includes a client browser for accessing web content. Likewise, permitted user 105 PC such as a website administrator is also likewise in signal communication with the website manager 102 via the network 115, and includes an instance of a client browser, such as Internet Explorer available from the Microsoft Corporation of Redmond, Wash., Netscape from Netscape Communications, Inc. of Mountain View, Calif., Safari from Apple Computer, Inc. of Cupertino, Calif., or other web browser capable of retrieving web-based information including static webpages or at least target webpages rendered from dynamic webpages.

Still referring to FIG. 1, the website manager includes an Apache web server 120 which handles routine inbound http:// . . . requests and performs other standard web server functions as is known in the art. Though, in this embodiment, the web server 120 comprises an Apache web server, other web servers known in the art may be interchangeably used without departing from the teachings of the invention. Such web servers could alternatively include for example: Internet Information Services from Microsoft Corporation of Redmond, Wash.; Zeus Web Server from Zeus of Cambridge, UK; Netscape Enterprise Server from Netscape Communications of Mountain View, Calif.; thttpd from ACME Laboratories of Berkley, Calif.; tigershark from directNIC of New Orleans, La.; WebSTAR from 4D, Inc. of San Jose, Calif.; Lotus Domino Server from International Business Machines of Armonk, N.Y.; or VisNetic WebSite from Deefield.com Software of Gaylord, Mich.; 120 includes an access control thread 125 that controls or restricts access to certain web pages maintained by the web site manager 102. Preferably, though not required, this access control thread looks at the originator of the http:// requests and passed CGI parameters as well as other request components in order to resolve and enforce webpage access control. As will be discussed in greater detail below, only limited access will be provided to PROOF and to previous-LIVE versions of dynamic web pages.

Also shown in FIG. 1 is an application server 140. This web logic application server may conveniently include a WebLogic™J2EE compliant Application Server product, version 6.1 or higher, from BEA Systems of San Jose, Calif. However, use of such product is not required, and in fact, any web logic application server capable of executing and rendering dynamic webpages, such as java server pages or active server pages, may be interchangeably utilized. As illustrated via pseudocode in FIG. 6, the Apache web server 120, forwards http:// requests for dynamic server pages to the application server 140. The application server 140, based on the contents of the request, finds the dynamic template from the dynamic template storage area 146 corresponding to the request, any relevant configuration data in the configuration database 147, any required runtime data contained in, e.g., the run time database 148 or from end-user or user input, and any shared assets contained in the shared asset file system 144 required to render the desired target website. As will be described in more detail below, in the case of published dynamic webpages, the web logic application server can also include static HTML files into the dynamic page to be rendered, which are stored in this embodiment within the hierarchical file system 144. The application server 140 also carries out any functional instructions embedded in the dynamic webpage, as is well-known in the art.

A data storage system 145 is also provided as part of the website manager 102. As discussed previously, this data storage system includes a number of logical file systems and databases in which one or more components of the dynamic pages are retained. It should be noted that the structure of data storage system according to this embodiment is only exemplary and is very schematic in nature. A wide variety of physical storage system alternatives may be interchangeably used in order to provide the necessary storage features. For example, the data storage system 145 may be provided on a distributed server farm, or any other combination of data storage units, including, as appropriate, a single storage system. One logical unit, the dynamic webpage storage area 146, stores the dynamic webpage templates upon which a number of target webpages managed by the website manager are based. It should be appreciated that a relatively small number of dynamic webpage templates which include feature-rich custom and predefined tags and/or sophisticated coding can define quite a variety of HTML, XML, VML, or other static forms of webpages.

The data storage system 145 also includes the configuration database 147. This configuration database handles the configuration data parameters that need to be passed to the dynamic webpage template stored in the dynamic webpage template file system 146 in order to render, at least in part, the desired target webpage. In the embodiment as detailed in FIG. 3, the configuration data for a dynamic webpage template is stored as a record in a flat relational database 147 as shown in FIG. 3. Here, each column 315, 320, 325 and 330 define a different record. As will be discussed in more detail below, one target webpage may have up to four versions of the configuration data to reflect different versions of the dynamic webpage managed by and accessible to the website manager 102. So, in this case, four rows 315, 320, 325, and 330 each define the different versions or flavors of a target webpage ("website 1" in FIG. 3) which utilize a common dynamic webpage template and potentially varying configuration data.

Noting in this embodiment that each version shares a common template, such limitation is not in fact required, and that different dynamic webpage templates may be referred to and utilized as well. Moreover, to simplify database construction, management, and data lookup, each column of the configuration database 147 represents the same type of configuration data. However, such architecture is not required to practice the invention and in fact variably sized and dissimilar records of configuration data may be utilized, as long as the data can be recalled by version from the database.

The website manager 102 of the embodiment shown in FIG. 1 is capable of providing four distinct versions of each dynamic website it manages. The versions include a restricted access work in progress ("WIP") version, a restricted access prototype ("PROTO") version for proofing or trial run purposes, an unrestricted access ("LIVE") version suitable for operation, and a backup or previous live ("PREVIOUS_LIVE") version of the immediately preceding live version. The WIP version is unpublished, meaning it remains fully dynamic (no pre-rendered static HTML equivalents for the static components). This unpublished configuration permits the widest degree of editing flexibility, since all static and dynamic components are built on-the-fly consistent with conventional dynamic webpage management. The remaining three versions are considered to be published since, in these cases, pre-rendered static html equivalents replace the dynamically coded static components of the dynamic webpage. The differences between published and unpublished webpages will be explored in more detail below with reference to FIG. 2. Transitioning between versions will be discussed in greater detail below with reference to FIG. 4.

Referring now back to FIG. 1, the storage system 145 also includes a runtime database 148. This runtime database includes runtime data collected from sources typically external to the website manager 102. As previously mentioned, runtime data differs from configuration data in that its content is important in and of itself and may change real time independently of webpage navigation, whereas configuration data contained in the configuration database is used to guide how the dynamically produced target page of interest will look and feel to the user. The configuration data basically instructs how to render the dynamic webpage, and such data is not necessarily important to the end-user or permitted user requesting the target webpage (assuming, of course, that it's correctly rendered). Using the automotive website example, runtime data may include used or new car inventory information pulled from a dealer or auto group database, or time sensitive advertising and promotion data.

The shared asset file system 149, another logical structure within the storage system 145, contains information that is shared across different webpages managed by and possibly websites hosted by the website manager 102. Such information can conveniently include graphics information shared across members of a common business entity such as an auto group, as in the case of commonly owned auto dealerships. Other shared assets could include sample pictures of new or used vehicles and new vehicle information, as well as trademarks and logos used by the OEM or manufacturers of automotive products and/or automobiles. Of course, such examples are not intended to be limiting in any way.

Still referring to FIG. 1, also provided within the storage system 145 is a file system 144 which is used to retain on a hierarchical basis, previously rendered static HTML equivalents of the static components of published versions of dynamic webpages. These equivalents, stored here as files, are used to speed up rendition of the dynamic template in a manner consistent with the present invention. An example structure is shown in FIG. 5. As shown in FIG. 5, each dynamic webpage maintained by the website manager 102 preferably has a number of subdirectories underneath it, one for each version. In this embodiment, for example purposes only, four versions are provided including a work in progress or . . . /WIP subdirectory 510, a prototype or . . . /PROTO subdirectory 515, a live or . . . /LIVE subdirectory 520, and a previous-live or backup . . . /PREVIOUS_LIVE subdirectory 525. These are all specified for the webpage 505.

Figure 4:
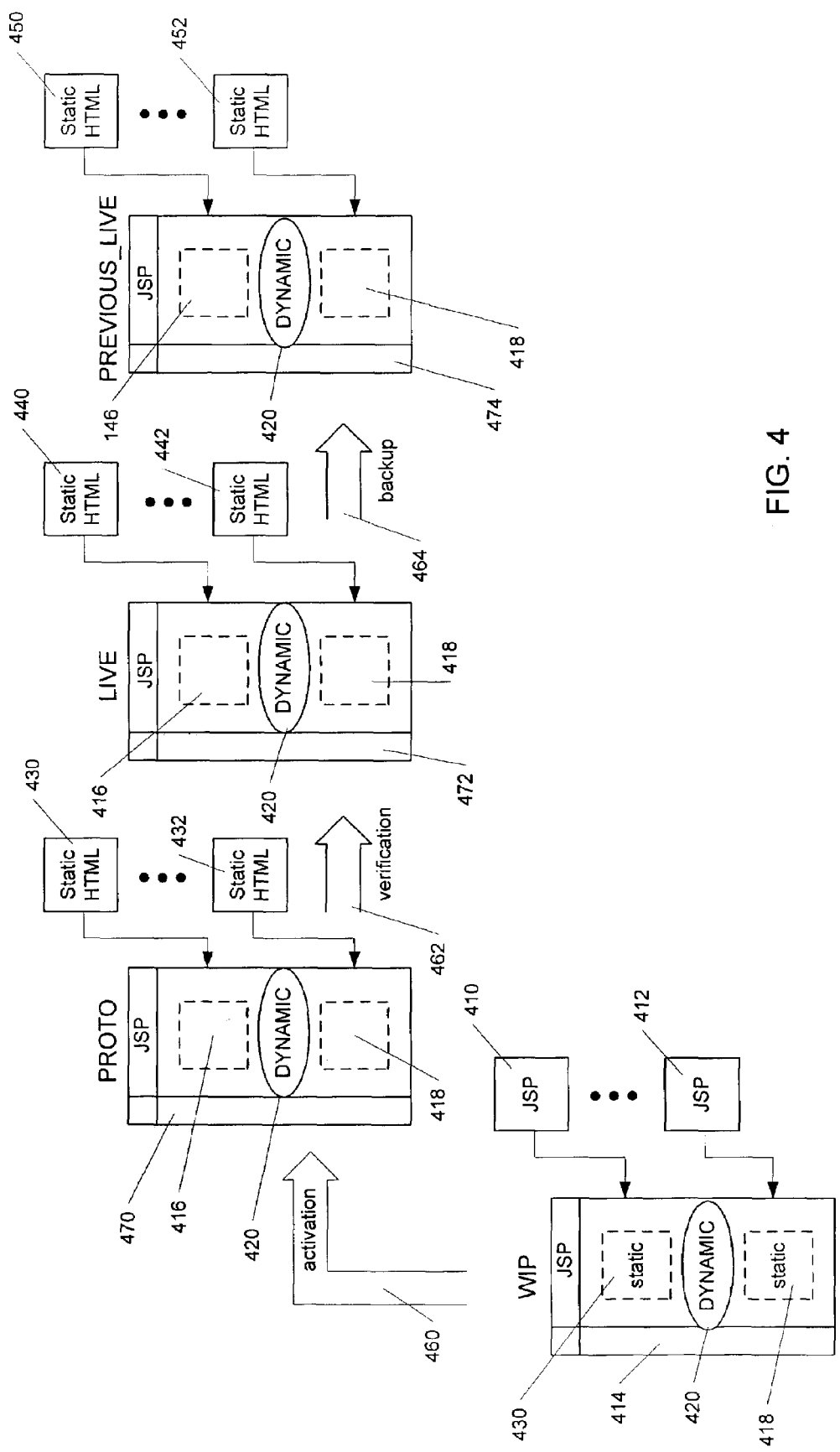
FIG. 4 diagrammatically illustrates publication stages of a dynamic webpage in accordance with an embodiment of the invention.

The static HTML equivalents are rendered as the dynamic webpage transitions from unpublished to PROOF, also known as an activation transition 460 shown in FIG. 4 for a JSP implementation. In particular, the publication engine 130 causes the static components of the JSP dynamic webpage to be rendered with relation to WIP configuration data contained in the configuration database 147. For example, if the activation transition 460 is considered with reference to FIG. 4, the JSP defined static components 410 and 412 are rendered by the publication engine 130 as static HTML files 430 and 432 (note that although two HTML files are shown as well as two JSP files, more or less static components may be provided in any given dynamic page). These static pages 430 and 432 would be stored under the prototype subdirectory 515 shown in FIG. 5. Moreover, the JSP files 410 and 412 dynamically defining the static components of the dynamic webpage 414 may be stored in this embodiment within the work in progress subdirectory 510. Alternatively, though not shown in FIG. 4, these JSP static component versions may be stored in-line with the rest of the dynamic webpage 414 in slots 416 and 418 respectively.

Other subdirectories defined by the file system 144 will be used as the webpage transitions to other types of versions including the LIVE and previous-LIVE versions discussed in more detail below with reference to FIG. 4.

Referring again to FIG. 1, also provided within the website manager 102 of the present embodiment is a WYSIWYG editor 130. This is a server based WYSIWYG editor, the details of which may be provided with reference to U.S. patent application Ser. No. 10/351,465, filed on even date herewith and entitled REMOTE WEB SITE EDITING IN A STANDARD WEB BROWSER WITHOUT EXTERNAL SOFTWARE, the contents of which are incorporated herein by reference. Other server based WYSIWYG editors including those provided by Ektron Corporation of Nashua, N.H. may be used interchangeably, as long as they can be adapted to support versioning consistent with the present invention.

The server based WYSIWYG editor 135 provides the ability to edit configuration data in the configuration database 147 for dynamic webpage templates stored on the template file system 146 in order to provide a tailored look and feel and interfacing. In an alternative embodiment, a conventional client-based WYSIWYG or other type of dynamic webpage editor may be utilized from e.g. the permitted user-client PC 105 as shown in FIG. 1.

Finally, the website manager 102 includes a publication engine 130. This publication engine helps dynamic webpages managed by the website manager 102 transition between versions. In particular, this publication engine 130 renders the static HTML equivalents as discussed above (see FIG. 7) at the activation transition 460. Include links to the static component equivalents may be conveniently created on the fly through passing the version information (column 310, FIG. 3) as part of the configuration during rendition of the dynamic webpage to "link" code presented in the template, such as a custom JSP tag having awareness of the hierarchical file system 144. Of course, other techniques for managing file links may be used as is known in the art. This is done so that when the prototype version of the dynamic webpage is requested via a web-browser, the correct . . . /PROTO static HTML files can be found within the file system 144 and included as part of the rendered target webpage. The publication engine 130 also carries out the tasks noted in the pseudocode presented in FIG. 8, including transitioning the prototype or . . . /PROTO dynamic webpage version into the commercially accessible LIVE version (transition verification 462 in FIG. 4).

Finally, the publication engine tracks and manages versioning of the configuration database 147. For example, as detailed with reference to pseudocode depicted in FIG. 7, during the WIP to PROTO version transition (aka activation 460), the publication engine copies configuration data stored for the WIP version (e.g. row 315 in FIG. 3) and places it in the PROTO version (row 320). Also, during the transition from PROOF to LIVE versions, as detailed with reference to FIG. 8, the publication engine 130 causes configuration data for the current LIVE version (row 325) to be preserved in the PREVIOUS_LIVE version (row 330), and then push PROOF configuration data (row 320) into row 325.

Figure 2:
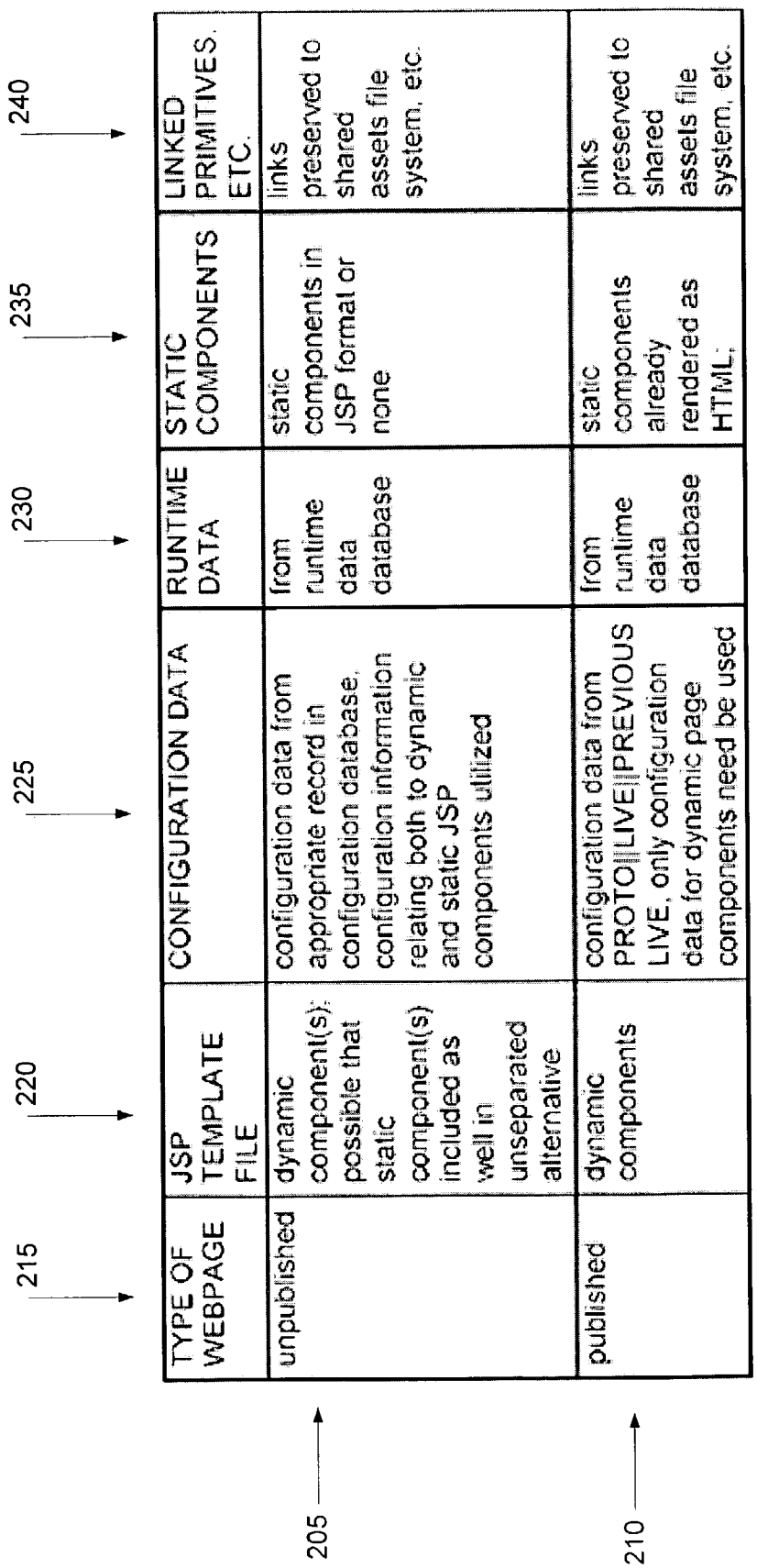
FIG. 2 describes the differences between unpublished and published dynamic webpages in accordance with an embodiment of the invention.

Turning now to FIG. 2, FIG. 2 discusses the differences in the configuration of unpublished and published dynamic webpages in accordance with the current embodiment. Here, the unpublished webpage elements are presented in row 205, whereas the published dynamic webpage elements are presented in row 210. The logical sum of all five elements in the row allows an application server such as server 140 render the dynamic page.

Referring first to column 220, it should be appreciated that both the unpublished and published versions of the dynamic webpage utilize a common dynamic webpage template herein stored in the template database 146 (possibly, in one implementation as a JSP text file). For the unpublished version, include information within the main template point to JSP encoded static component files as provided by version and webpage id configuration information in the present embodiment. As mentioned above, these JSP files may be stored with the template file in the template database 146, or could be stored within the WIP version subdirectory (e.g. subdirectory 510 in FIG. 5). However, the particular placement of the JSP files defining the static components dynamically is not important as long as it can be made accessible to the web logic server 140 when the dynamic page needs to be rendered. For the published versions (PROTO, LIVE, PREVIOUS_LIVE), links to the appropriate subdirectories (e.g. . . . /PROTO subdirectory 515, . . . /LIVE subdirectory 520, . . . /PREVIOUS_LIVE subdirectory 525) are created within the template through the aforementioned webpage id and version configuration data.

Note here that in an alternative embodiment not shown in the figures, the static components in the unpublished version of the webpage may be presented in line as part of the template file and not as include dynamic webpage files such as a dynamic JSP file 410 or 412 shown in FIG. 4. In yet a further alternative embodiment, the static html equivalents of these JSP files (e.g. files 430, 432 for PROTO version, files 440, 442 for LIVE version, and files 450, 452 for PREVIOUS LIVE version) could be included in-line with the dynamic components in the JSP template file, with different versions of the template file tracked and managed.

Referring now to row 210, in the published case, looking at column 220, only the dynamic components utilized from the JSP template are used. The static components are defined by the HTML equivalents stored in the file system 144.

Column 225 illustrates the difference in configuration data between an unpublished and published webpage in accordance with the present embodiment. Referring now to column 225, the configuration data in the unpublished case takes the configuration data from the appropriate record (one of WIP, PROTO, LIVE, or PREVIOUS_LIVE records for the webpage depending on which webpage version the present WIP version originates from), loaded at the beginning of an edit session, in the configuration database 147 specified for the webpage of interest. It should be noted that after initial edit and save as work in progress, further configuration database information will thereafter be plucked from the WIP record contained in the configuration database until an activation transition is invoked. Once the initial configuration information or data has been retrieved from the version undergoing edit, a copy of that configuration information is stored and updated in the WIP record for the webpage. It should be noted that all of the configuration data contained in the record will be utilized for the unpublished version, as the entire dynamic webpage, both static and dynamic components thereof, will be rendered dynamically by the web logic application server. Compare this to the entry in row 210, where only the configuration data for the dynamic page components need be referred to and utilized. This is because the static components have already been pre-rendered in HTML form equivalents, thus eliminating the need for consultation with the static component configuration data contained in the configuration database 147. Next, appropriate runtime data is plucked from the runtime database 148 shown in FIG. 1.

Turning to the static components column 235, for the unpublished version, if there are additional static component files, such static component files will be in the dynamic format, as discussed above. In the case of published versions, the static components will have been rendered by the publication engine 130 and stored in the appropriate version subdirectory of the file system 144. Column 240 discusses treatment of links, primitives, embedded objects, images and other types of shared assets. In either case of unpublished or published dynamic webpage, links are preserved to the shared file asset system 149 or to other places either locally or remotely accessible to the website manager 102 as is known in the art.

The four dynamic webpage versions will now be discussed in greater detail with reference to FIG. 4. In particular, FIG. 4 illustrates a transition diagram for a particular dynamic webpage in accordance with an embodiment of the invention. In particular, four successive versions are shown including WIP, PROTO, LIVE and PREVIOUS-LIVE. The WIP or work-in-progress version places the dynamic webpage in an unpublished, fully dynamic configuration suitable for editing. In other words, in the initial WIP or work in progress state, the dynamic webpage is fully dynamic (i.e. fully defined in terms of JSP or ASP files+ configuration data). In such case both the static 410, 412 and dynamic components 420 are presented in dynamic form, and configuration data contained in the configuration database is necessary to define a particular instance of the webpage.

In this embodiment, the static components have been already segregated out from the main template body of the dynamic webpage 414. These include JSP files 410 and 412 and these may conveniently be stored in the . . . /WIP subdirectory for the webpage, or may be retained with the template containing the dynamic components within the template storage area 146. Separation of the static components in such manner increases modularity and portability as well as enable quicker eventual rendering of the static components once the WIP version has been activated for proofing (transition 460). This also enables the publication engine 130 to easily distinguish from a template designer's perspective which components are static versus dynamic, by simply referring to the include statement in the main dynamic webpage template file 414. However, in another embodiment, the static components 410 and 412 may be contained in-line in e.g. spaces 416 and 418 of the main template 414, though doing so may complicate versioning from a template perspective. Even in such case, e.g. JSP tagging or other dynamic coding may be used to indicate that certain components are static whereas certain other components such as dynamic component 420 are in fact dynamic and cannot be rendered in static HTML, XML, VML, or other markup language suitable for direct loading by a web browser.

When the user requests a prototype version of a WIP dynamic webpage (transition 460), the publication engine 130 undertakes to pre-render the static components contained in the separate JSP files 410 or 412 or, alternatively, contained within place holders 416 and 418 of the main dynamic webpage. This is done to improve overall on-the-fly rendering performance since less dynamic webpage code and configuration data (only that defining the dynamic components of the webpage) need be rendered on-the-fly. In comparison, conventional dynamic webpage management techniques require the entire page to be rendered on-the-fly by the web server. Once rendered in separate files, 430 and 432, they are stored under the PROTO subdirectory for the webpage of interest in the file system 144. The dynamic components 420 remain within the dynamic webpage template 470. In addition, as noted in FIG. 7, the publication and engine updates the links inside the dynamic webpage template 470 in order for it to point to the correct static HTML files 430, 432. In addition, the publication engine 130 apprises the user requesting the proof of the URL address in which to load and execute the PROTO version of the desired dynamic webpage.

Once the permitted user, after proofing the prototype webpage, desires to enable it for public or commercial use, customer facing entities, this user initiates a verification transition 462 with the publication engine 130. At this transition, the publication engine 130 performs several actions. First, it determines whether for backup purposes the previous LIVE version needs to retain static HTML files or in fact need only store configuration information. It should be realized that only configuration information need be stored in order to recreate the webpage at least dynamically for the previous version (assuming the dynamic template and JSP include files remain unchanged, or, at worst are backwards compatible with the PREVIOUS_LIVE version). However, keeping the static HTML files may impart the performance boost and also preserve a truer version of the previous LIVE website. Thus, in this case, the static HTML files are preserved in the PREVIOUS_LIVE subdirectory of the file system 144 or the webpage in question as files 450 and 452. Configuration data for the current LIVE version is stored in the PREVIOUS_LIVE record in the configuration database and orchestrated by the publication engine 130. These steps preserve the current LIVE version.

Next, referring to FIGS. 4 and 8, the PROTO versions of the static html equivalents 440, 442 and configuration data are pushed to the LIVE storage areas in the file system 144 and configuration database 147 respectively by the publication engine 130.

It will be obvious to those having skill in the art that many changes may be made to the details of the above-described embodiments without departing from the underlying principles of the invention. The scope of the present invention should, therefore, be determined only by the following claims.

The invention claimed is:

1. A method for processing a dynamic webpage on a server, comprising:
   accessing a dynamic webpage template and associated configuration data;
   utilizing the dynamic webpage template and configuration data to present a static component and a dynamic component in a dynamic format such that the static and dynamic components are in a fully dynamic configuration suitable for editing to thereby generate an unpublished dynamic webpage;
   publishing the unpublished dynamic webpage by splitting the unpublished dynamic webpage into;
      a pre-rendered static markup language equivalent file comprising the static component of the unpublished dynamic webpage, and
      a published dynamic webpage, separate from the pre-rendered static markup language equivalent file, comprising the dynamic component of the unpublished dynamic webpage;
   updating a link inside the published dynamic webpage that points to the pre-rendered static markup language equivalent file;
   generating a target webpage on the server by;
      rendering the published dynamic webpage as a dynamic target webpage, and
      combining the rendered dynamic target webpage with the pre-rendered static markup language equivalent file; and
   transmitting the target webpage from the server to a client.

2. The method of claim 1 wherein combining the rendered dynamic target webpage with the pre-rendered static markup language equivalent file comprises linking the dynamic target webpage to the separate pre-rendered static markup language equivalent file.

3. The method of claim 1, further comprising storing the dynamic webpage template in a dynamic template storage area of a data storage system.

4. The method of claim 1, further comprising storing the configuration data in a configuration database of a data storage system.

5. The method of claim 1, further comprising storing the pre-rendered static markup language equivalent file in a file system of a data storage system.

6. The method of claim 1, wherein the pre-rendered static markup language equivalent file comprises at least one of an html file, an xml file, and a vml file.

7. An article of manufacture for processing a dynamic webpage on a server, comprising:
a machine-readable medium having instructions stored thereon to:
access a dynamic webpage template and associated configuration data;
utilize the dynamic webpage template and configuration data to present a static component and a dynamic component in a dynamic format such that the static and dynamic components are in a fully dynamic configuration suitable for editing to thereby generate an unpublished dynamic webpage;
publish the unpublished dynamic webpage by splitting the unpublished dynamic webpage into;
a pre-rendered static markup language equivalent file comprising the static component of the unpublished dynamic webpage, and
a published dynamic webpage, separate from the pre-rendered static markup language equivalent file, comprising the dynamic component of the unpublished dynamic webpage;
update a link inside the published dynamic webpage that points to the pre-rendered static markup language equivalent file;
generate a target webpage on the server by;
rendering the published dynamic webpage as a dynamic target webpage, and
combining the rendered dynamic target webpage with the pre-rendered static markup language equivalent file; and
transmit the target webpage from the server to a client.

8. The article of manufacture of claim 7 wherein combining the rendered dynamic target webpage with the pre-rendered static markup language equivalent file comprises linking the dynamic target webpage to the separate pre-rendered static markup language equivalent file.

9. The article of manufacture of claim 7, wherein the instructions are further to store the dynamic webpage template in a dynamic template storage area of a data storage system.

10. The article of manufacture of claim 7, wherein the instructions are further to store the configuration data in a configuration database of a data storage system.

11. The article of manufacture of claim 7, wherein the instructions are further to store the pre-rendered static markup language equivalent file in a file system of a data storage system.

12. The article of manufacture of claim 7, wherein the pre-rendered static markup language equivalent file comprises at least one of an html file, an xml file, and a vml file.

13. A website manager for providing a target webpage to a client, comprising:
a web server to receive a request from the client for a dynamic webpage and to return a target webpage to the client in response;
a data storage system in electrical communication with the web server and including a computer readable medium having stored thereon a dynamic webpage template, a static component, a dynamic component, and configuration data; and
an application server in electrical communication with the data storage system to perform the method of:
accessing the data storage system to retrieve the dynamic webpage template and configuration data;
utilizing the dynamic webpage template and configuration data to present a static component and a dynamic component in a dynamic format such that the static and dynamic components are in a fully dynamic configuration suitable for editing to thereby generate an unpublished dynamic webpage;
publishing the unpublished dynamic webpage by splitting the unpublished dynamic webpage into;
a pre-rendered static markup language equivalent file comprising the static component of the unpublished dynamic webpage, and
a published dynamic webpage, separate from the pre-rendered static markup language equivalent file, comprising the dynamic component of the unpublished dynamic webpage;
updating a link inside the published dynamic webpage that points to the pre-rendered static markup language equivalent file;
generating the target webpage on the server by;
rendering the published dynamic webpage as a dynamic target webpage, and
combining the rendered dynamic target webpage with the pre-rendered static markup language equivalent file; and
transmitting the target webpage from the server to the client.

14. The website manager of claim 13, further comprising a publication engine to publish the unpublished dynamic webpage as the pre-rendered static markup language equivalent file comprising the static component of the unpublished dynamic webpage, and a published dynamic webpage, separate from the pre-rendered static markup language equivalent file, comprising the dynamic component of the unpublished dynamic webpage.

15. The website manager of claim 13, wherein the data storage system includes a dynamic template storage area for storing a plurality of dynamic webpage templates.

16. The website manager of claim 13, wherein the data storage system includes a configuration database for storing configuration data.

17. The website manager of claim 13, wherein the data storage system includes a file system for storing a plurality of pre-rendered static markup language equivalent files.

18. The website manager of claim 17, wherein the file system is a hierarchical file system.

19. The website manager of claim 13, wherein the pre-rendered static markup language equivalent file comprises at least one of an html file, an xml file, and a vml file.

20. The website manager of claim 13, further comprising an editor in electrical communication with the data storage system to edit configuration data.

21. A method for processing a dynamic webpage on a server, comprising:
accessing a dynamic webpage template and associated configuration data;
utilizing the dynamic webpage template and configuration data to dynamically render a static component and a dynamic component so that the dynamically rendered static and dynamic components are in a fully dynamic configuration suitable for editing to thereby generate an unpublished dynamic webpage;

publishing the unpublished dynamic webpage by splitting the unpublished dynamic webpage into;
    a pre-rendered static markup language equivalent file comprising the static component of the unpublished dynamic webpage, and
    a published dynamic webpage, separate from the pre-rendered static markup language equivalent file, comprising the dynamic component of the unpublished dynamic webpage;

updating a link inside the published dynamic webpage that points to the pre-rendered static markup language equivalent file;

generating the target webpage on the server by;
    rendering the published dynamic webpage as a dynamic target webpage, and
    combining the rendered dynamic target webpage with the pre-rendered static markup language equivalent file; and transmitting the target webpage from the server to a client.

22. An article of manufacture for processing a dynamic webpage on a server, comprising:

a machine-readable medium having instructions stored thereon to:
    access a dynamic webpage template and associated configuration data;
    utilize the dynamic webpage template and configuration data to dynamically render a static component and a dynamic component so that the dynamically rendered static and dynamic components are in a fully dynamic configuration suitable for editing to thereby generate an unpublished dynamic webpage;
    publish the unpublished dynamic webpage by splitting the unpublished dynamic webpage into;
        a pre-rendered static markup language equivalent file comprising the static component of the unpublished dynamic webpage, and
        a published dynamic webpage, separate from the pre-rendered static markup language equivalent file, comprising the dynamic component of the unpublished dynamic webpage;
    update a link inside the published dynamic webpage that points to the pre-rendered static markup language equivalent file;
    generate a target webpage on the server by;
        rendering the published dynamic webpage as a dynamic target webpage, and
        combining the rendered dynamic target webpage with the pre-rendered static markup language equivalent file; and
    transmit the target webpage from the server to a client.

23. A website manager for providing a target webpage to a client, comprising:

a web server to receive a request from the client for a dynamic webpage and to return a target webpage to the client in response;

a data storage system in electrical communication with the web server and including a computer readable medium having stored thereon a dynamic webpage template, a static component, a dynamic component and configuration data; and an application server in electrical communication with the data storage system to perform the method of:
    accessing the data storage system to retrieve the dynamic webpage template and configuration data;
    utilizing the dynamic webpage template and configuration data to dynamically render a static component and a dynamic component so that the dynamically rendered static and dynamic components are in a fully dynamic configuration suitable for editing to thereby generate an unpublished dynamic webpage;
    publishing the unpublished dynamic webpage by splitting the unpublished dynamic webpage into;
        a pre-rendered static markup language equivalent file comprising the static component of the unpublished dynamic webpage, and
        a published dynamic webpage, separate from the pre-rendered static markup language equivalent file, comprising the dynamic component of the unpublished dynamic webpage;
    updating a link inside the published dynamic webpage that points to the pre-rendered static markup language equivalent file;
    generating the target webpage on the server by;
        rendering the published dynamic webpage as a dynamic target webpage, and
        combining the rendered dynamic target webpage with the pre-rendered static markup language equivalent file, wherein combining comprises linking the pre-rendered static markup language equivalent file to the dynamic target webpage; and
    transmitting the target webpage from the server to the client.

\* \* \* \* \*

UNITED STATES PATENT AND TRADEMARK OFFICE
CERTIFICATE OF CORRECTION

PATENT NO. : 7,386,786 B2 Page 1 of 1
APPLICATION NO. : 10/350810
DATED : June 10, 2008
INVENTOR(S) : Lee M. Davis et al.

It is certified that error appears in the above-identified patent and that said Letters Patent is hereby corrected as shown below:

On the Title Page (56)

In the first citation under "OTHER PUBLICATIONS," it reads:

"http://www.archive.org/audio/au-dio-searchresults.php?search=@start=0&limit=100&sort=ad,"

which should read:

--http://www.archive.org/audio/audio-searchresults.php?search=@start=0&limit=100&sort=ad,--

Column 6, Line 54 reads, ". . . and previous-LIVE versions . . ." which should read --. . . and PREVIOUS_LIVE versions . . .--

Column 7, Line 50 reads, ". . . as server 140 render . . ." which should read --. . . as server 140 to render . . .--

Column 9, Line 2 reads, ". . . and PREVIOUS-LIVE." which should read --. . . and PREVIOUS_LIVE.--

Column 9, Lines 61-62 read, ". . . commercial use, customer facing entities, this user initiates . . ." which should read --. . . commercial use, this user initiates . . .--

Signed and Sealed this

Twelfth Day of August, 2008

JON W. DUDAS
*Director of the United States Patent and Trademark Office*